United States Patent
Ogawa

(10) Patent No.: US 12,032,983 B2
(45) Date of Patent: Jul. 9, 2024

(54) METHOD OF ACCESSING DEVICE IN VIRTUAL ENVIRONMENT

(71) Applicant: DENSO CORPORATION, Kariya (JP)

(72) Inventor: Shuichi Ogawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 778 days.

(21) Appl. No.: 17/129,762

(22) Filed: Dec. 21, 2020

(65) Prior Publication Data

US 2021/0149705 A1    May 20, 2021

Related U.S. Application Data

(63) Continuation of application No. PCT/JP2019/021077, filed on May 28, 2019.

(30) Foreign Application Priority Data

Jul. 3, 2018 (JP) .................................. 2018-126799

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4881* (2013.01); *G06F 9/5066* (2013.01); *G06F 2009/4557* (2013.01); *G06F 2009/45579* (2013.01)

(58) Field of Classification Search
CPC ............... G06F 9/45558; G06F 9/4881; G06F 2009/45579
See application file for complete search history.

(56) References Cited

U.S. PATENT DOCUMENTS

| | | | | |
|---|---|---|---|---|
| 10,372,497 | B1* | 8/2019 | Zelenov | G06F 9/54 |
| 2016/0070598 | A1* | 3/2016 | Vadkerti | G06F 9/5077 |
| | | | | 718/104 |
| 2016/0189332 | A1* | 6/2016 | Yoo | G06F 3/14 |
| | | | | 345/156 |
| 2017/0102963 | A1* | 4/2017 | Zhang | G06F 9/45533 |
| 2017/0139862 | A1* | 5/2017 | Arndt | G06F 9/542 |
| 2017/0220384 | A1* | 8/2017 | Anderson | G06F 9/4893 |
| 2018/0321985 | A1* | 11/2018 | Kakaiya | G06F 9/545 |
| 2019/0065250 | A1* | 2/2019 | Du | G06F 9/45558 |
| 2019/0138472 | A1* | 5/2019 | Dusanapudi | G06F 9/4881 |
| 2020/0125397 | A1* | 4/2020 | Wu | G06F 9/45558 |

FOREIGN PATENT DOCUMENTS

JP    2017518589 A    7/2017

* cited by examiner

*Primary Examiner* — Lewis A Bullock, Jr.
*Assistant Examiner* — Kevin X Lu
(74) *Attorney, Agent, or Firm* — Harness, Dickey & Pierce, P.L.C.

(57) ABSTRACT

The access method includes: implementing a resident virtual CPU to which a physical CPU is always assigned and a non-resident virtual CPU to which a physical CPU is not always assigned, on the virtual machine in the virtual environment; and taking over the process of accessing the virtual device by the non-resident virtual CPU when accessing from the resident virtual CPU to the virtual device corresponding to the occupancy type physical device.

7 Claims, 3 Drawing Sheets

METHOD OF ACCESSING DEVICE IN VIRTUAL ENVIRONMENT

CROSS REFERENCE TO RELATED APPLICATION

The present application is a continuation application of International Patent Application No. PCT/JP2019/021077 filed on May 28, 2019, which designated the U.S. and claims the benefit of priority from Japanese Patent Application No. 2018-126799 filed on Jul. 3, 2018. The entire disclosures of all of the above applications are incorporated herein by reference.

TECHNICAL FIELD

The present disclosure relates to a method for accessing a device in a virtual environment in which a virtual computer system is established.

BACKGROUND

In recent years, the adoption of a virtual environment in which a virtual computer system is constructed on hardware is advancing. In such a virtualized environment, a hypervisor is generally operated on one hardware, and a plurality of virtual computer systems are operated on the hypervisor. As a result, it is possible to realize high integration and high performance of the system, for example, it becomes possible to execute a plurality of processes in parallel. Hereinafter, a virtual computer system is referred to as a virtual machine, a CPU provided in hardware is referred to as a physical CPU, a device is referred to as a physical device, a CPU virtualized on a virtual machine is referred to as a virtual CPU, and a device is referred to as a virtual device.

SUMMARY

The access method includes: implementing a resident virtual CPU to which a physical CPU is always assigned and a non-resident virtual CPU to which a physical CPU is not always assigned, on the virtual machine in the virtual environment; and taking over the process of accessing the virtual device by the non-resident virtual CPU when accessing from the resident virtual CPU to the virtual device corresponding to the occupancy type physical device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
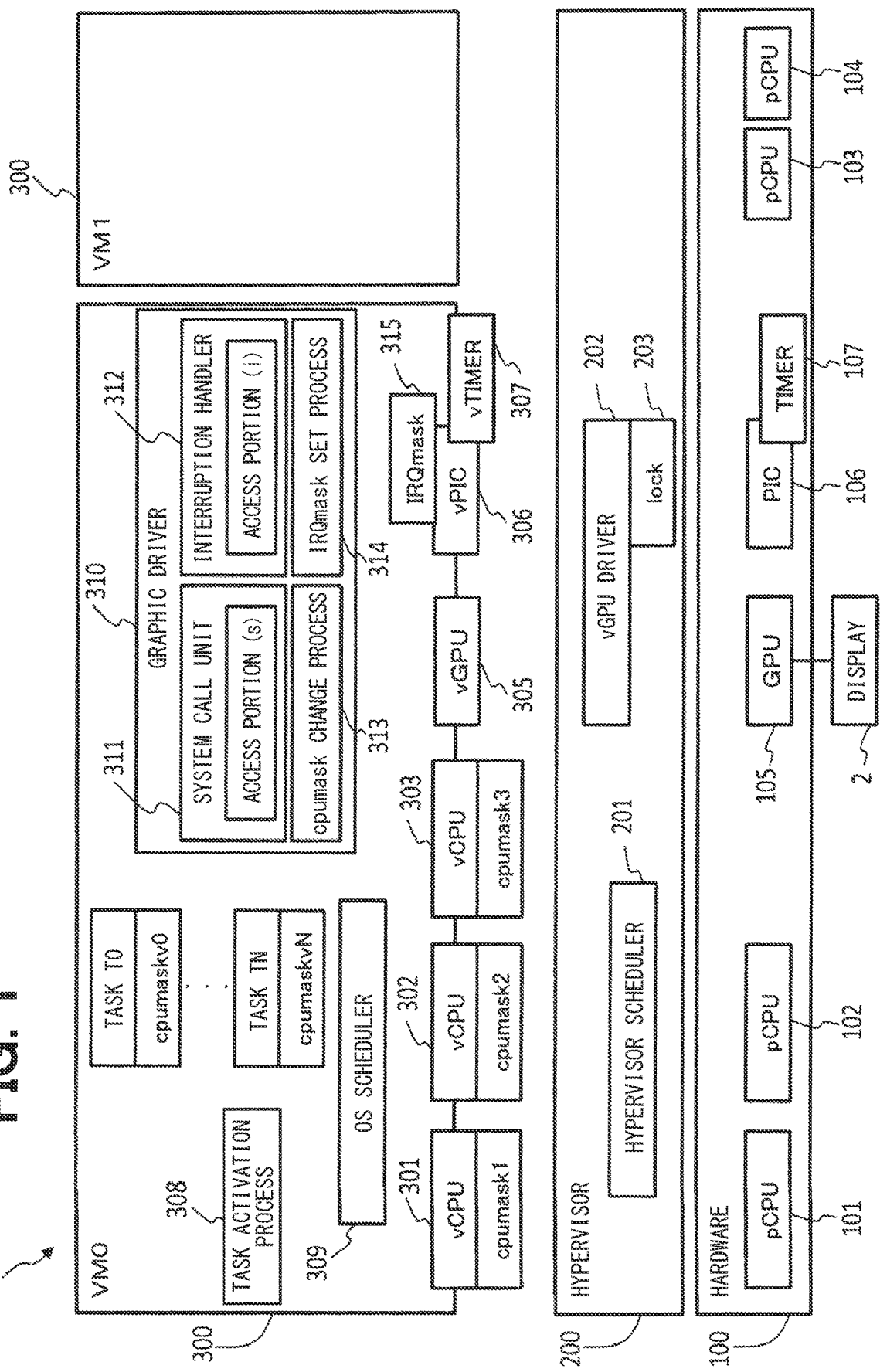
FIG. 1 is a diagram schematically showing an example of a virtualized environment according to the first embodiment.

Now, the virtual machine operates while accessing physical devices such as storages and network interfaces provided in the hardware. At this time, on the virtual machine, the virtual CPU accesses the physical device by accessing the virtual device. Therefore, even when a plurality of virtual machines are constructed, each virtual machine can operate independently without considering the existence of other virtual machines.

However, since one physical device cannot be accessed from multiple virtual machines at the same time, when multiple virtual machines are built, each virtual machine decides to use the physical device exclusively. In that case, an exclusive waiting situation in which the virtual machine waits for the completion of access from another virtual machine occurs depending on the access timing. Therefore, in order to efficiently handle the exclusive waiting situation, there is a virtualization technique called virtio.

The virtio is configured such that the device driver on the hypervisor queues the access request from each virtual machine and returns a response to the request when the access to the physical device is completed. For this reason, the request for access to the physical device and the response to the request are separated, and the period from the request for access to the return of the response is the so-called I/O wait state. The virtual CPU as an access source can execute other tasks during the I/O waiting period. Then, for such a virtio, a proposal has been made to improve the efficiency of the virtual environment, such as improving the interrupt overhead as in a conceivable technique.

By the way, among physical devices, there are devices in which it is difficult to separate an access request and a response. For example, since the Graphics Processing Unit (hereinafter referred to as GPU) needs to access its own register to transmit a drawing request memory having a complicated structure, it is generally difficult to separate an access request and a response. Therefore, conventionally, when accessing the GPU, the process from the start of drawing to the completion of drawing triggered by the read/write instruction to the drawing request memory has been collectively executed.

However, when the processes up to the end of access are collectively executed, the virtual CPU that is the access source is executing the read/write instruction to the register of the GPU until the drawing is completed. In that case, since the task that processes drawing cannot be placed in the I/O wait state, even if the access source virtual CPU is waiting for a response from the GPU, the virtual CPU can not execute other tasks during the waiting period.

When the virtual CPU is occupied in this way, it becomes impossible to switch to another task, the processing capacity of the virtual machine is reduced, and the utilization efficiency of the allocated physical CPU is also reduced. Thus, it causes a decrease in the performance of the entire virtual environment.

In view of the above points, an access method is provided to be capable of suppressing a decrease in performance when accessing a device of a type that occupies the CPU of the access source in a virtual environment in which a virtual computer system is constructed on hardware.

In order to achieve the above object, in the access method according to one aspect of the present embodiments, a resident virtual CPU that is always assigned to a physical CPU and a non-resident CPU that is not always assigned a physical CPU are implemented on the virtual machine. When accessing a virtual device corresponding to an exclusive physical device from a resident virtual CPU, the process of accessing the virtual device is executed by the non-resident virtual CPU instead.

In this case, the resident virtual CPU, which is the initial access source, is released from the process of accessing the virtual device, so that the resident virtual CPU can execute other processes. On the other hand, the non-resident virtual CPU that executes the process for accessing the virtual device instead is occupied by the virtual device on the virtual machine, but the state thereof is recognized as not working even when waiting for a response from the physical device from the viewpoint of the hypervisor.

Therefore, on the hypervisor, the physical CPU can be released from the allocation of the non-resident virtual CPU that is not operating at all, and the released physical CPU can be assigned to a resident virtual CPU.

As a result, when accessing an exclusive physical device in a virtual environment, it is possible to execute other processing on the virtual machine by the resident virtual CPU while continuing the process accessed by the non-resident virtual CPU. Therefore, even when accessing the exclusive physical device that occupies the CPU of the access source, it is possible to suppress the deterioration of the performance of the virtual environment.

Embodiments are described below with reference to the drawings. Further, the configurations that are substantially common in each embodiment will be described with the same reference numerals.

First Embodiment

Hereinafter, the first embodiment will be described with reference to FIGS. 1 and 2.

As shown in FIG. 1, the virtualization environment 1 of the present embodiment includes hardware 100, a hypervisor 200 operating on the hardware 100, and a plurality of virtual machines 300 operating on the hypervisor 200. Hereinafter, the CPU included in the hardware 100 will be referred to as a physical CPU, the device in the hardware 100 will be referred to as a physical device, the CPU virtualized on the virtual machine 300 will be referred to as a virtual CPU, and the device on the virtual machine 300 will be referred to as a virtual device.

The hardware 100 includes, for example, four pCPU101 to pCPU104 corresponding to physical CPUs, a GPU 105 (i.e., Graphics Processing Unit) corresponding to a physical device, a Programmable Interrupt Controller (hereinafter PIC) 106, a TIMER 107, and the like. In the case of the present embodiment, a CPU in which four CPU cores are accommodated in a single package is provided on the hardware 100, and each of these four CPU cores is treated as an individual physical CPU. Further, in each physical CPU, pCPU 101 and pCPU 102 are assigned to the VM0 as the virtual machine 300, and pCPU 103 and pCPU 104 are assigned to the VM1 as the virtual machine 300.

As is well known, the GPU 105 has a function of processing drawing on the display 2, and in the present embodiment, drawing is processed by transmitting a drawing request memory having a complicated structure to its own register. Although the details of the GPU 105 will be described later, it is difficult to separate the request and the response for accessing the GPU 105, and the GPU 105 corresponds to an exclusive type physical device having an interface of a type that occupies the CPU of the access source during an access to the register. The GPU 105 is also a common device shared by each virtual machine 300.

The PIC 106 has well-known functions for controlling interrupts generated on the hypervisor 200, such as setting of interruptions from physical devices such as the GPU 105, and setting of the CPUs as a notification target of enabling/disabling and interrupting. The TIMER 107 has a function of measuring various times required on the hypervisor 200, and is used for a well-known process such as a timer interruption. Although not shown, a storage device such as an embedded Multi Media Card (hereinafter, eMMC) and a physical device such as a communication device such as a Network Interface Card (hereinafter, NIC) are also provided on the hardware 100.

As is well known, the hypervisor 200 is software that causes, for example, a plurality of virtual machines 300 to operate by virtualizing the hardware 100. In the present embodiment, it is assumed that the hypervisor 200 operates directly on the hardware 100 and the virtual machine 300 operates on the hypervisor 200, which is called a bare metal type or a native type. The hypervisor 200 is provided with a hypervisor scheduler 201, a vGPU driver 202, and the like.

The hypervisor scheduler 201 is software that schedules each virtual machine 300 and the like. The vGPU driver 202 is driver software for realizing a virtual device on the virtual machine 300, and in the present embodiment, the vGPU 305, which is a virtual device that is obtained by virtualizing the GPU 105, is realized on the virtual machine 300.

The vGPU driver 202 has an exclusive lock function 203 that exclusively processes an access from each virtual machine 300. In FIG. 1, the exclusive lock function 203 is shown as a lock. When the vGPU driver 202 is requested to access the physical device from each virtual machine 300, the vGPU driver 202 controls so that the physical device can be used properly in response to the request of each virtual machine 300 by processing exclusively the access from each virtual machine 300 with the exclusive lock function 203. Although not shown in FIG. 1, the hypervisor 200 is also equipped with driver software for other applications and other physical devices.

As is well known, the virtual machine 300 is a virtual computer system that operates on the hypervisor 200, operates a virtual operating system (hereinafter, virtual OS) on a virtual CPU, and performs various processes while accessing a virtual device. In this embodiment, the two virtual machines 300 of VM0 and VM1 built on the hypervisor 200 have the same configuration. Therefore, in the following, the virtual machine 300 of VM0 will be mainly described as an example. It is also possible to build a virtual machine 300 having a different configuration.

The virtual machine 300 includes vCPU301, vCPU302 and vCPU303 corresponding to virtual CPUs, vGPU305, vPIC306, vTIMER307 and the like corresponding to virtual devices. Here, the vCPU 301 and the vCPU 302 correspond to resident virtual CPUs that are always assigned to physical CPUs and operable, and the vCPU 303 is not always assigned to physical CPUs and is assigned to the physical CPU as needed so that the vCPU 303 corresponds to a non-resident virtual CPU which is operable as necessary. That is, in the virtual machine 300, the virtual CPUs which are always operable are implemented with the same number as the physical CPUs.

A cpumask indicating a physical CPU that can be assigned is set in each virtual CPU. In this cpumask, identification information of a physical CPU that can be assigned is set as, for example, a bit string. For example, in the case of the VM0, values indicating that two physical CPUs of the pCPU101 and the pCPU102 can be assigned are set in the three virtual CPUs of the vCPU301, the vCPU302, and the vCPU303, respectively. In the case of the VM1, a value indicating that two physical CPUs of the pCPU103 and the pCPU104 can be assigned is set in the cpumask of the three virtual CPUs. That is, each virtual CPU on each virtual machine 300 is assigned so that the physical CPUs do not overlap with each other.

As a result, the physical CPUs are individually allocated to the virtual CPUs of each virtual machine 300, respectively, and it is possible to eliminate the possibility that the operations of each virtual machine 300 affect the performance of the other virtual machine 300. Note that cpumask provides a value that identifies a physical CPU that can be assigned, and the hypervisor scheduler 201 determines which physical CPU is actually assigned.

As is well known, a task activation process 308 for activating various tasks T0 to TN, and an OS scheduler 309 for scheduling the activated tasks are implemented on the virtual machine 300. Further, a virtual driver, which is driver software for accessing the virtual device, is mounted on the virtual machine 300. In this embodiment, a graphic driver 310 for accessing vGPU305 is provided. Although not shown in FIG. 1, driver software for other virtual devices is also implemented.

For each task, cpumaskv is set by the task activation process 308. Identification information such as the number of a virtual CPU capable of executing the task is set in this cpumaskv. In the case of the present embodiment, the cpumaskv of each task provides a value that allows execution on the resident virtual CPUs of the vCPU301 and the vCPU302, but does not allow execution on the non-resident virtual CPUs of the vCPU303. Therefore, the activated task is assigned to either the vCPU301 or the vCPU302 by the OS scheduler 309 that refers to the cpumaskv. At this time, the OS scheduler 309 allocates tasks so that each virtual CPU is used equally.

The graphic driver 310 includes a system call unit 311 having an access portion (s) for accessing the virtual device and an interruption handler unit 312 having an access portion (i), which provide to access the vGPU305 as an exclusive type virtual device. Since the operations of the system call unit 311 and the interruption handler unit 312 are well known, the description thereof will be omitted.

Further, the graphic driver 310 has a cpumask change process 313 and an IRQmask setting process 314. The details will be described later, but the cpumask change process 313 is a process for changing the cpumask set in the task, although the details will be described later. The IRQmask set process 314 is the process to set the IRQmask 315 indicating the virtual CPU for operating the interruption handler 312. In the case of the vGPU 305, in the IRQmask set process 314, the interruption handler 312 is set to operate only in the vCPU 303 when the virtual machine 300 is activated.

Next, the effects of the configuration described above will be explained.

First, the operation of the virtualization environment 1 that employs the hypervisor 200 will be briefly described. The hypervisor 200 operates the virtual machine 300 in parallel while using the hypervisor scheduler 201, the physical CPU, the PIC 106, the timer 107, and the like. At this time, in order to maximize the real-time performance of each virtual machine 300, the cpumask is set and the physical CPU is individually allocated to each virtual machine 300 so as not to be affected by the other virtual machines 300, and so as not to affect other virtual machines 300.

Specifically, for example, when the vCPU 301 and the vCPU 302 are in the operating state and the vCPU 303 is in the standby state, the hypervisor scheduler 201 refers to the cpumask of the vCPU 301 and vCPU 302, for example, assigns the pCPU 101 to the vCPU 301, and assigns the pCPU 102 to the vCPU 302. The operating state referred to here means a state in which some processing is assigned to the virtual CPU, and when a physical CPU is assigned to the virtual CPU in the operating state, the virtual CPU becomes an operable state.

On the other hand, when the vCPU 303 is in the operating state, the hypervisor 200 allocates the pCPU 101 or pCPU 102 to the vCPU 303, and during that period, either the vCPU 301 or the vCPU 302 is in the state of waiting for the physical CPU. In this way, the hypervisor 200 allocates the physical CPUs as evenly as possible to the virtual CPUs so that the virtualization environment 1 operates efficiently. As a result, each virtual machine 300 can operate with the same performance as an OS equipped with two physical CPUs, and simultaneous execution of a plurality of tasks is realized in the same manner as a normal OS that does not use the hypervisor 200.

By the way, in such a virtual environment 1, each virtual machine 300 may share and access a physical device such as the GPU 105 on the hardware 100 and the above-mentioned eMMC or NIC. Therefore, in the virtualization environment 1, for example, by operating the vGPU driver 202 on the hypervisor 200 and realizing a virtual device on the virtual machine 300, each virtual machine 300 can be accessed like an independent device.

Here, when the hardware 100 includes one physical device, access requests from a plurality of virtual machines 300 are processed exclusively in a time-division manner. In that case, when another virtual machine 300 is accessing, the virtual machine 300 is in an exclusive wait state, so that a virtualization technique such as the above-mentioned virtio is provided.

Here, some physical devices may include an exclusive type device in which it is difficult to separate the access request and the response as in the GPU 105 of the present embodiment, and the task can not become the waiting state for the I/O since the register instruction is being executed at the time of access. When accessing such an exclusive type device, for example, even in the state where merely waiting for the response from the GPU 105, other tasks cannot be executed during the waiting time, so the performance of environment 1 will be degraded.

Specifically, in terms of the GPU 105, tasks other than drawing cannot be executed during drawing execution, and the CPU cannot be effectively used, which causes a delay in other processing. In particular, since in the drawing process, a large amount of memories on the virtual machines 300 are accessed, it may be assumed that the waiting time may take several tens of milliseconds, for example. In that case, if other tasks cannot be executed, sound interruption may occur if the audio reproduction task is being executed at the same time as the image task. In addition, it may be assumed that the process for obtaining real-time performance is not executed or is delayed.

Therefore, in the present embodiment, the virtual CPU is occupied during access to the occupancy type device and cannot be switched to another task, but the physical CPU is in a state where nothing is processed. In view of this point, the deterioration of the performance of the virtual environment 1 is suppressed.

Hereinafter, the access method of the present embodiment will be described by taking as an example of a case where a request for access to the GPU 105 is issued from the task T0 activated on the virtual machine 300. In the case of a general OS, an application has a process space and is sometimes referred to as a thread. In the present specification, an unit of programs which can be executed at the same time is referred to as a task even if the program is an application software or executed in the operating system.

Now, when task T0 is started on the virtual machine 300, task T0 is assigned to the vCPU301 or the vCPU302 according to the setting of the cpumaskv. Here, as shown in FIG. 2, it is assumed that the task T0 is started at the time t0 and the task T0 is assigned to the vCPU 301, for example. As shown in the physical CPU allocation state of FIG. 2, it is assumed that the vCPU 301 that executes the task T0 is assigned the pCPU 101 as the physical CPU. Further, the thick line provided corresponding to each task in FIG. 2 indicates that the physical CPU is assigned.

When the task T0 is executed and the graphic driver 310 is called, the system call unit 311 operates in the task T0. First, the system call unit 311 executes a cpumask change process 313 that changes the cpumask v0 of the task T0 so that the cpumask v0 can be executed only by the vCPU 303. Further, in this cpumask change process 313, when it is confirmed that cpumask v0 is changed to a value that does not include the vCPU301 and the vCPU302, the OS scheduler 309 is instructed to re-assign the task T0 to the vCPU303 that has become able to execute the task T0.

When an instruction is given to the OS scheduler 309, and the vCPU 303 is used for another task, the vCPU 303 is temporarily in the waiting state. But when the vCPU 303 is not used or the waiting state ends, the task T0 is assigned to the vCPU303, and the vCPU 303 is put into an operation state. Since the operating state of the virtual CPU is checked by the hypervisor scheduler 201 on the hypervisor 200, the hypervisor scheduler 201 also detects that the vCPU 303 is in the operating state.

The hypervisor scheduler 201 that has detected that the vCPU 303 is in the operating state assigns the vCPU 303 to the physical CPU in addition to the vCPU 301 and the vCPU 302. In this state, three virtual CPUs temporarily operate on two physical CPUs. Therefore, for example, if the pCPU101 is assigned to the vCPU303 at time t1 in FIG. 2, the vCPU301 to which the pCPU101 has been assigned until then is temporarily waiting for the physical CPU. That is, at time t1, the virtual CPU that executes the task T0 is switched from the vCPU301 to the vCPU303.

At this point, the system call unit 311 is ready to operate on the vCPU 303, so that the processing of the system call unit 311 can be continued on the vCPU 303. Therefore, the system call unit 311 calls the access portion (s), and the access portion (s) accesses the register of the vGPU305. Although the access to the vGPU 305 is transmitted to the vGPU driver 202 on the hypervisor 200, the exclusive lock function 203 provides the stand-by state temporarily in order to adjust the timing of the execution of another virtual machine 300 and to prepare for accessing the GPU 105. At this time, the vCPU 303 puts on a standby state since the vCPU 303 waits for unlocking.

Figure 2:
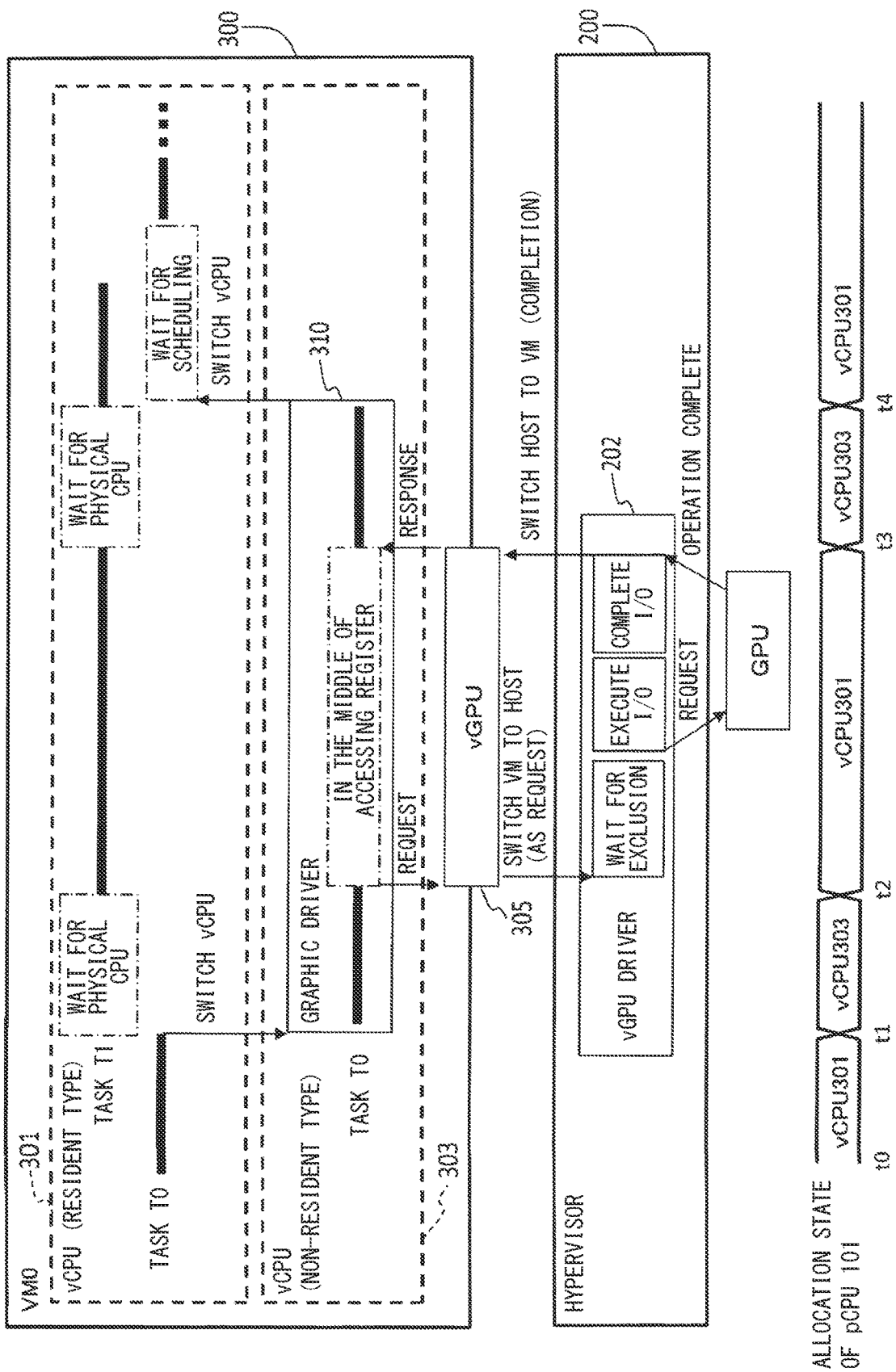
FIG. 2 is a diagram schematically showing an example of an operation at the time of access and an allocation state of a physical CPU.

For example, when the vCPU 303 puts on the standby state at time t2 in FIG. 2, the VM host switching operation is performed such that the processing is transferred from the virtual machine 300 to the hypervisor 200. At this time, the hypervisor scheduler 201 releases the allocation of the pCPU 101 to the vCPU 303 that is in the standby state and does not perform any processing, and reassigns the pCPU 101 to the vCPU 301 that is in the physical CPU waiting state so that the vCPU 301 is in an operable state. When the vCPU 301 becomes operable, the task T1 can be executed by the vCPU 301 on the virtual machine 300, for example.

Therefore, even in the state where two physical CPUs are assigned to the three virtual CPUs, the allocation of the physical CPUs can be released because the vCPU 303 is in the standby state, and as a result, two virtual CPU of the vCPU 301 and the vCPU 302 substantially and exclusively use two physical CPUs. Therefore, even if the access to the register of the access part (s) is delayed or the access takes time, the performance of the virtualization environment 1 as a whole is substantially equivalent to the state in which two physical CPUs are assigned to two virtual CPUs, so that it is possible to maintain the performance of the virtual environment 1.

By the way, when the lock of the exclusive wait state is released by the vGPU driver 202 and the access to the GPU 105 is completed, the result is returned to the access portion (s), so that the task T0 can be operated, more specifically, the interrupted access portion (s) becomes in a state where the operation can be restarted. In this case, it is necessary to allocate a physical CPU to the vCPU 303, but the hypervisor scheduler 201 that detects that the task T0 is in an operable state reviews the allocation of the physical CPU after a predetermined scheduling time, and the pCPU 101 is assigned to, for example, the vCPU 303. As a result, the access portion (s) restarts the operation.

Then, when the processing of the access portion (s) is completed, the cpumask change process 313 provides to change the cpumask v0 to be a value that allows execution in the vCPU301 and the vCPU302, but does not allow execution in the vCPU303. That is, the cpumask v0 is returned to the original value. As a result, the task T0 proceeds to a state for waiting for the operation of the vCPU301 or the vCPU302, and the vCPU303 becomes a state for performing no process.

Therefore, the hypervisor scheduler 201 operates so as to release the physical CPU allocation of the vCPU 303 which has not processed anything and allocate the physical CPU to the vCPU 301 and the vCPU 302. As a result, the vCPU 301 and the vCPU 302 restore the pCPU 101 and pCPU 102 to a state in which they can be used full-time, respectively.

Here, during the access to the register, the task T0 is not in a standby state, but in the operating state on the vCPU 303. Since the OS scheduler 309 cannot switch from the task in the operating state to another task, conventionally, the scheduler 309 can not cause the vCPU 301 that has executed the task T0 to execute the other task.

On the other hand, in the present embodiment, the execution subject of the task T0 is switched from the vCPU301 to the vCPU303 in the cpumask change process 313. That is, the process of accessing the vGPU 305 is delegated to the vCPU 303. In this state, three virtual CPUs operate, but since the vGPU driver 202 is substantially in the exclusive wait state, the hypervisor scheduler 201 does not allocate a physical CPU to the vCPU 303 but allocates the physical CPU to the vCPU 301 and the vCPU 302.

That is, by providing the vCPU 303, which is a non-resident virtual CPU, and configuring the vCPU 303 to be in a standby state for waiting for the completion of the operation of the vGPU 305, the vCPU 301 can be released from the task T0, and the vCPU 301 can executed another task, and it is possible to provide efficient operation of the entire virtualization environment 1.

Here, the system call unit 311 of the graphic driver 310 may access the register after waiting for a change in the state of the vGPU 305 as long as the purpose of the system call is obtained only by accessing the register of the vGPU 305. In this case, the system call unit 311 records the request content in the memory, sets it to operate when the state of the vGPU 305 changes, and ends.

The change of the state of the vGPU305 is notified by an interruption. At this time, the PIC 106 notifies the hypervisor scheduler 201 of the interruption. Since the vCPU303 is set by the IRQmask 315 of the vPIC306, the notified interruption will be processed by the vCPU303. Therefore, the hypervisor scheduler 201 allocates a physical CPU to the vCPU 303 in order to operate the interruption handler 312 of the vCPU 303.

When the interruption handler 312 operates and the access part (i) accesses the register of the vGPU305, the access to the vGPU305 is transmitted to the vGPU driver 202 on the hypervisor 200, but the exclusive lock function 203 temporarily provides the standby state in order to wait for the execution of another virtual machine 300 and to prepare the access to the GPU 105. At this time, the vCPU 303 puts on a standby state since the vCPU 303 waits for unlocking. At this time, the hypervisor scheduler 201 releases the allocation of the physical CPU to the vCPU 303 which is in the exclusive waiting state, and allocates the physical CPU to the vCPU 301 and the vCPU 302 to operate, as in the access portion (s). As a result, other tasks on the virtual machine 300 can be operated while waiting for access to the register of the access unit (i).

Then, when the exclusive wait state of the vGPU driver 202 is completed, the access portion (i) restarts the operation, and the GPU 105 can be accessed via the vGPU driver 202. Further, when the operation of the interruption handler 312 is completed, the vCPU 303 becomes free, and the hypervisor scheduler 201 only executes the processes of the vCPU 301 and the vCPU 302.

As described above, in the present embodiment, in the graphic driver 310, the processes of the access portion (s) and the access portion (i) are executed by the non-resident vCPU 303, so that an access method is adopted in which other tasks can be executed by the resident virtual CPU even when the access to the register is waited for and the access source CPU is occupied.

According to the access method described above, the following effects can be obtained.

The access method includes: implementing a resident virtual CPU (i.e., the vCPU301 and the vCPU302) to which a physical CPU is always assigned and a non-resident virtual CPU (i.e., the vCPU303) to which a physical CPU is not always assigned, on the virtual machine 300 in the virtualization environment 1; and taking over the process of accessing the virtual device when accessing from the resident virtual CPU to the virtual device corresponding to the occupancy type physical device.

As a result, the process is transferred from the resident virtual CPU that is the access source to the non-resident virtual CPU, and even if the non-resident virtual CPU becomes the occupation state during the access, other tasks can be executed in the resident virtual CPU. In this case, when the non-resident virtual CPU that becomes the occupancy state during the access enters the standby state in which nothing is processed substantially, the physical CPU allocation can be released, so the task to the occupied device is continued, and it is possible to assign a physical CPU to the resident virtual CPU to execute other tasks.

Therefore, the physical CPU can be effectively used even when accessing the occupied physical device, and it is possible to suppress the performance degradation when accessing the occupancy type device in the virtualization environment 1 in which the virtual computer system is constructed on the hardware 100.

In addition, the register access in the system call request is assumed to be performed in two cases when the system call is extended and when the interrupt is extended. In either case, the above access method can be applied and it is possible to effectively use the physical CPU when accessing the occupancy type device.

In this case, since the non-resident virtual CPU does not become an allocation target of the physical CPU unless it is in the operating state, it does not affect the performance of the virtual environment 1, which is different from the configuration in which three resident virtual CPUs are simply provided and three virtual CPUs are scheduled in chronological order. Therefore, it is particularly effective when the virtual environment 1 is required to have real-time performance.

In this case, as in the present embodiment, the driver software for accessing the occupied virtual device includes the system call unit 311 and the interruption handler 312, and the access method includes: implementing the virtual driver in which the access portion for accessing the virtual device is arranged on each of the system call unit 311 and the interruption handler 312; and handing over at least the access portion (s, i) with the non-resident virtual CPU when accessing an exclusive virtual device from a resident virtual CPU.

Even with such a configuration, even if it is difficult to separate and process the access portion (s), it is possible to easily take over the access to the occupancy type device with the non-resident virtual CPU so that it is possible to suppress a decrease in performance when accessing an occupancy type device.

Further, even when two or more virtual machines 300 are operated on the hypervisor 200 as in the present embodiment, by adopting the above-mentioned access method in each virtual machine 300, the performance of each virtual machine 300 can be improved. That is, by operating two or more virtual machines 300 on the hypervisor 200 and allocating physical CPUs to the plurality of virtual machines 300 so as not to overlap with each other, more specifically, by allocating each physical CPU to a respective virtual CPU on each virtual machine 300 so as not to overlap with each other, it can be expected that the performance of the virtual environment 1 will be maximized.

Further, in the present embodiment, the configuration in which the hardware 100 includes one occupying physical device is described, even when the hardware 100 includes a plurality of occupying physical devices, the above access method can be adopted by implementing the same number of non-resident virtual CPUs as the occupancy type physical devices equipped in the hardware 100.

In other words, by providing resident virtual CPUs having the number thereof equal to the number of physical CPUs assigned to the virtual machine 300 and providing non-resident virtual CPUs having the number thereof equal to the number of occupied physical devices as an access target in the virtual machine 300, it is possible to secure the same performance as a conceivable environment during the period other than when accessing the occupied physical device, and it is possible to execute another task which is not executed in the conceivable environment during the period when accessing the occupied physical device. Thus, the performance of the virtual environment 1 is improved.

Here, the number of resident virtual CPUs may be larger than the number of physical CPUs assigned to the virtual machine 300, if necessary. Even in such a configuration, by separately providing a non-resident virtual CPU, it is possible to suppress a decrease in performance when accessing an exclusive device.

Second Embodiment

A second embodiment will be described with reference to FIG. 3. The second embodiment is different from the first embodiment in that the access portion (s) operated by the system call unit 311 is a dedicated task.

Figure 3:
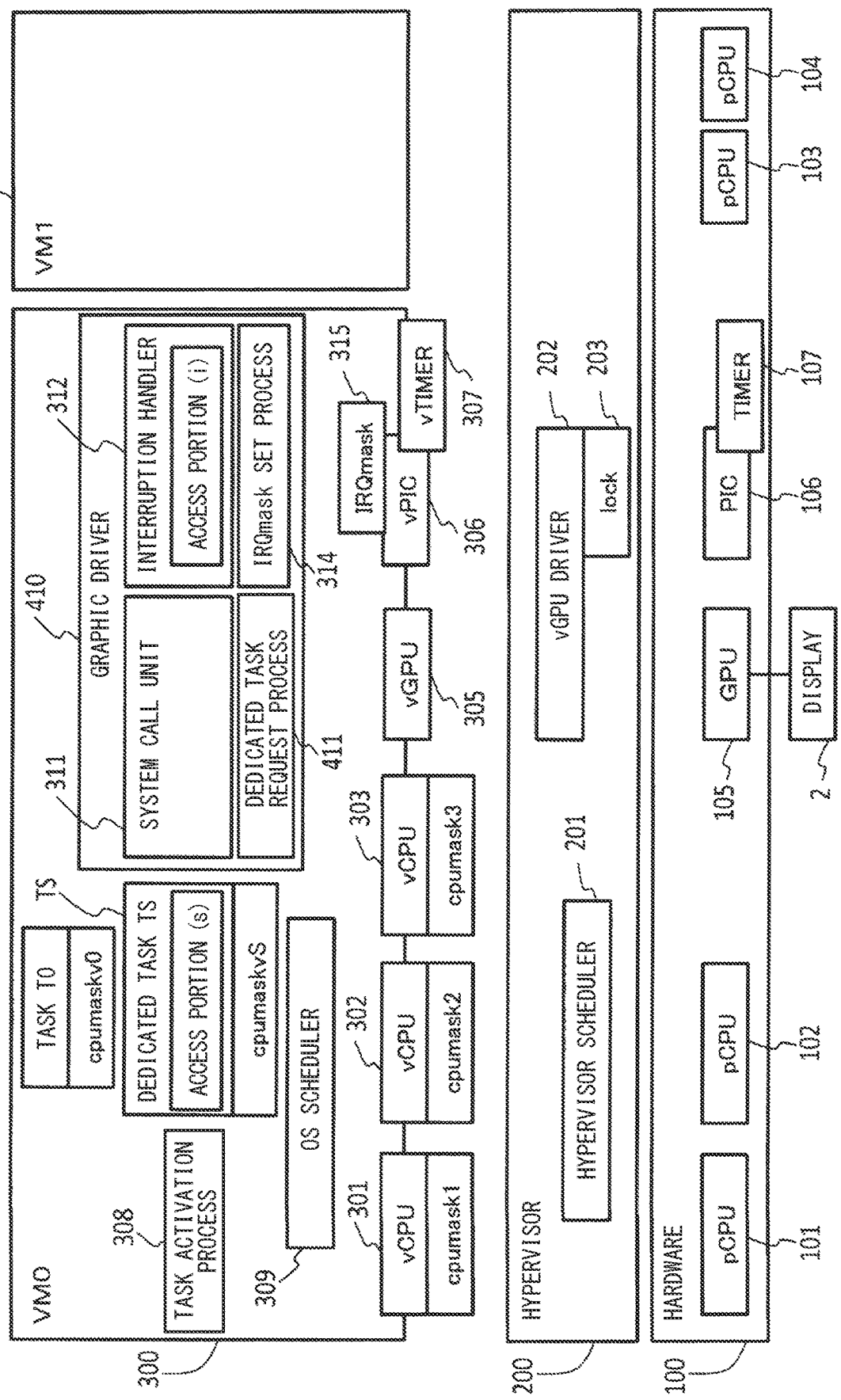
FIG. 3 is a diagram schematically showing an example of a virtualized environment according to the second embodiment.

As shown in FIG. 3, the virtualization environment 1 of the present embodiment includes hardware 100, a hypervisor 200 operating on the hardware 100, and a plurality of virtual machines 300 operating on the hypervisor 200. The hypervisor 200 is running on the hardware 100, and two virtual machines 300, that are the VM0 and the VM1, are running on the hypervisor 200.

Similar to the first embodiment, the hardware 100 includes four pCPU101 to pCPU104 corresponding to physical CPUs, and GPU105, PIC106, and TIMER107 corresponding to physical devices. Here, the pCPU101 and the pCPU102 are assigned to the virtual machine 300 of the VM0, and the pCPU103 and the pCPU104 are assigned to the virtual machine 300 of the VM1.

Similar to the first embodiment, the GPU 105 is an exclusive type physical device having an interface that occupies the CPU of the access source while accessing the register since it is difficult to separate the request and the response of the access to the GPU 105.

The hypervisor 200 is provided with a hypervisor scheduler 201, a vGPU driver 202, and the like, as in the first embodiment. Similar to the first embodiment, the virtual machine 300 includes vCPU 301 and vCPU 302 corresponding to a resident virtual CPU, vCPU 303 corresponding to a non-resident virtual CPU, vGPU305, vPIC306, vTIMER307 and the like corresponding to a virtual device. A task activation process 308 for starting various tasks, an OS scheduler 309 for scheduling the activated tasks, and the like are implemented.

Further, a graphic driver 410 as a virtual driver is implemented on the virtual machine 300. The graphic driver 410 of the present embodiment is configured so that the access portion (s) that processes the access to the vGPU 305 performed by the system call unit 311 provides the dedicated task TS in the dedicated task request process 411 so that the access portion (s) is capable of being called. The cpumask vS is set in the dedicated task TS so that only the vCPU 303 is operable.

When the access from the task T0 activated on the virtual machine 300 to the vGPU 305 is generated, the graphic driver 410 is called and the system call unit 311 operates. Then, the system call unit 311 requests the access portion (s) of the dedicated task TS to start the process by the dedicated task request process 411, and waits for the completion of the process of the access portion (s). At this point, the vCPU 301 is in a waiting state, so that other tasks can be operated on the vCPU 301. That is, when the vCPU 303 is in the waiting state during the execution of the dedicated task TS, the vCPU 301 can be operated.

This dedicated task TS starts processing in the vCPU 303 according to the setting of the cpumask vS. In this state, the number of virtual CPUs to which the physical CPUs are assigned is three, so the hypervisor scheduler 201 tries to evenly distribute the pCPU 101 and the pCPU 102 to the three virtual CPUs. Then, when the physical CPU is assigned to the vCPU 303, the access portion (s) of the dedicated task TS starts processing to access the vGPU driver 202, and temporarily suspends the process if it is waiting for exclusion of another virtual machine 300. Then, when the exclusive waiting state is released, the access portion (s) restarts the process.

When the processing of the access portion (s) is completed, the vCPU 303 goes into a standby state without processing, the dedicated task request process 411 to which the completion is notified resumes the operation, and the system call unit 311, similar to the first embodiment, is in the state of waiting for the operation completion of the vGPU 305 until the interrupt handler 312 operates.

As described above, in the present embodiment, the access portion (s) is the dedicated task called from the graphic driver 410, so that the access request, that is, the start of the process for the access portion (s) and the response to the request, that is, the completion of the processing of the access portion (s) are separated from each other. As a result, access to vGPU305 can be performed as a pseudo I/O, and other tasks can be executed during the I/O waiting period.

Therefore, the physical CPU can be effectively used even when accessing the occupied physical device, and it is possible to suppress the performance degradation when accessing the occupancy type device in the virtualization environment 1 in which the virtual computer system is constructed on the hardware 100.

In this case, as in the first embodiment, the resources of the virtual environment 1 are not unnecessarily reduced, and the performance of the virtual environment 1 is not affected. Thus, this feature is particularly significant when the real-time response of the virtual environment 1 is required. In addition, there is no need to modify basic parts such as the task activation process 308 and the OS scheduler 309.

Further, as in the present embodiment, the driver software for accessing an exclusive virtual device includes a system call unit 311 and an interruption handler 312, and implements a virtual driver configured to call the access portion that processes the access to the virtual device executed by the system call unit 311, as a dedicated task TS, and executes the dedicated task TS with the non-resident virtual CPU when accessing the occupancy type virtual device from the resident virtual CPU, so that it is possible to access the virtual device as a pseudo I/O.

As a result, the operation of the virtual CPU becomes simpler than that of the first embodiment, so that the above-mentioned access method can be easily realized when the target is a device in which the access portion (s) can be clearly separated.

Here, when the target is a device in which the access portion (s) cannot be clearly separated, the access method of the first embodiment may be better. Therefore, for example, when there are a plurality of target occupied physical devices, the non-resident virtual CPUs having the number thereof equal to the number of the occupied physical devices may be implemented, and a plurality of virtual drivers suitable for each access method may be also implemented so that the access method according to the first embodiment and the access method of the second embodiment can be used properly depending on the physical device.

OTHER EMBODIMENTS

In the second embodiment, the configuration in which the dedicated task TS is provided on the virtual machine 300 is described. Alternatively, a configuration in which similar processing is performed on the hypervisor 200 may be also adopted. Specifically, in the hypervisor scheduler 201 on the hypervisor 200, in addition to the virtual machine 300, a task configured to be directly accessible to the occupied physical device is arranged as a scheduling target, and, when an access request from a non-resident virtual CPU is issued, it is possible to access the exclusive physical device by using the task arranged on the hypervisor 200.

In such a configuration, the vGPU driver 202 on the hypervisor 200 can wait for the process from the virtual machine 300 side until the operation of the physical device is completed when the task is processing the access to the physical device, as in the second embodiment. Therefore, the request for access from the non-resident virtual CPU can be treated as a pseudo I/O, and the allocation of the physical CPU to the non-resident virtual CPU during the I/O waiting period is released, so that other tasks can be executed in the resident virtual CPU.

As a result, it is possible to suppress a decrease in performance when accessing the device, and it is possible to maintain the performance of each virtual machine 300 even when operating two or more virtual machines 300 on the hypervisor 200. Thus, it is possible to obtain the same effect as that of each embodiment. Further, since the task is arranged on the hypervisor scheduler 201, its operation can be scheduled without going through the OS scheduler 309 on the virtual machine 300. Therefore, for example, it is applied to an application that requires real-time performance, and it is suitable for high priority processing.

In each embodiment, an example in which the access to the occupied physical device is delegated to the non-resident virtual CPU is described. Alternatively, a configuration for selecting whether or not to delegate to the non-resident virtual CPU based on the time required for access may be established. Specifically, the maximum waiting time required to access the occupied physical device measured by a preliminary test or the like is preliminarily set, and when the maximum waiting time is longer than the preset specified time, the process of accessing is delegated to the non-resident virtual CPU. On the other hand, when the maximum waiting time is shorter than the specified time, the access process can be executed by the resident virtual CPU.

As a result, for example, when the time required for the process of delegating the access is longer than the usage time of the physical CPU obtained by delegating the access, it may be possible not to delegate the access, and it is possible to suppress the decrease of the performance of the virtualized environment without intension.

In each embodiment, the GPU 105 is described as an exclusive physical device. Alternatively, the access method of the present embodiment is not limited to the GPU 105, and for example, may be applied to the access to a device such as a general-purpose computing on graphics processing unit (i.e., GP GPU) in which the GPU 105 is applied to a process other than the image processing, an image processing unit (hereinafter, IPU) dedicated to image processing, and a device having a vendor-specific interface.

In each embodiment, an example in which four physical CPUs are assigned to two virtual machines 300 is described, but the number of virtual machines 300 is not limited to this. When the number of virtual machines 300 to be constructed is defined as M, and the number of physical CPUs included in the hardware 100 is M or more, the physical CPUs can be assigned to each virtual machine 300 without duplication. That is, it is possible to operate two or more virtual machines 300 on the hypervisor 200 and allocate the physical CPUs to the plurality of virtual machines 300 so as not to overlap each other. At this time, each virtual machine 300 is provided with the same number of resident virtual CPUs as the number of allocated physical CPUs, and is provided with the same number of non-resident virtual CPUs as the number of target occupied physical devices. By applying the above described access method, it is possible to suppress the deterioration of the performance of the virtual environment 1.

Although the present disclosure has been described in accordance with the embodiments, it is understood that the present disclosure is not limited to the embodiments and structures disclosed therein. The present disclosure also includes various modifications and modifications within an equivalent range. In addition, various combinations and forms, and further, other combinations and forms including only one element, or more or less than these elements are also within the sprit and the scope of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An access method for accessing physical device by a resident virtual CPU using a virtual device in a virtual environment, wherein:
   the virtual environment operating on hardware having at least a physical CPU and the physical device, wherein the virtual environment comprises a hypervisor, and at least one virtual machine that operates on the hypervisor, wherein the virtual machine, has the resident virtual CPU and a non-resident virtual CPU that virtualizes the physical CPU using the virtual device that virtualizes the physical device, and
   the physical device is an occupancy type physical device that is not interruptible during exclusive servicing of requests from the resident or the non-resident virtual CPU,
   the access method comprising:
      allocating the physical CPU to the resident virtual CPU to execute a task, wherein the allocating includes:
         indicating in a mask of the resident virtual CPU, the allocation of the physical CPU;
         indicating in a mask of the non-resident virtual CPU, no allocation of the physical CPU; and
         in response to receiving a task request from executing task, processing the received task request comprises:
            determining whether the task request is a task request to the physical device;
            responsive to determining the task request is to the physical device:
               changing the indication in the mask of the resident virtual CPU to have no allocation of the physical CPU;

changing the indication in the mask of the non-resident virtual CPU to have an allocation of the physical CPU;

subsequent to the change in indications, reassigning execution of the task to the non-resident virtual CPU;

processing, by the non-resident virtual CPU, the determined task request by communicating with the virtual device virtualizing the physical device;

subsequent to the allocating and in response to the non-resident virtual CPU being in a standby state for processing the determined task request:

changing the indication in the mask of the non-resident virtual CPU to have no allocation of the physical CPU changing the indication of the mask of the resident virtual CPU to have an allocation of the physical CPU; and subsequent to the change in indications, executing another task at the resident virtual CPU; and while executing another task on the resident virtual CPU, waiting on the status of the determined task request by the non-resident virtual CPU.

2. The access method according to claim 1, wherein:
the virtual device is an occupancy type virtual device, the access method further comprising:
implementing a virtual driver on the virtual machine, the virtual driver being a driver software for accessing the occupancy type virtual device and including a system call unit and an interruption handler, each of which includes an access portion for accessing the virtual device; and
processing, by the non-resident virtual CPU, the determined task request further comprising: executing the access portion of the system call unit or the interruption handler by the non-resident virtual CPU to access the virtual device, wherein:
when the system call unit waits for a change in a state of the virtual device, the access portion of the interruption handler accesses the virtual device.

3. The access method according to claim 1, wherein:
the virtual device is an occupancy type virtual device, the access method further comprising:
implementing a virtual driver on the virtual machine, the virtual driver being a driver software for accessing the occupancy type virtual device and including a system call unit and an interruption handler, and being capable of calling an access portion for processing the access to the virtual device executed by the system call unit as a dedicated task; and
processing, by the non-resident virtual CPU, the determined task request further comprising: executing the dedicated task by the non-resident virtual CPU, wherein:
the dedicated task is executable with separating a start of the processing of the access by the access portion of the system call unit and a completion of the processing of the access by the access portion of the system call unit.

4. The access method according to claim 1, further comprising:
arranging another task as a scheduling target together with the virtual machine in a hypervisor scheduler on the hypervisor, the task configured to be directly accessible to the occupancy type physical device;
processing, by the non-resident virtual CPU, the determined task request further comprising: executing a dedicated task by the non-resident virtual CPU when accessing the virtual device corresponding to the occupancy type physical device from the resident virtual CPU; and
when an access request is made from the non-resident virtual CPU which executes the dedicated task, accessing the occupancy type physical device by the another task arranged on the hypervisor, wherein:
dedicated task is executable with separating a start of the processing of the access by the access portion of the system call unit and a completion of the processing of the access by the access portion of the system call unit.

5. The access method according to claim 1, further comprising:
setting a maximum waiting time required to access the occupancy type physical device the maximum waiting time is a maximum time measured by a preliminary test as the maximum time from when the virtual CPU requests the access to when the occupancy type physical device returns a response to the virtual CPU;
processing, by the non-resident virtual CPU, the determined task request further comprising: when the maximum waiting time is shorter than a predetermined specific time, taking over the process for accessing by the resident virtual CPU.

6. The access method according to claim 1, wherein:
the physical CPU includes a plurality of physical CPUs; and
the at least one virtual machine includes a plurality of virtual machines, the access method further comprising:
operating the plurality of virtual machines on the hypervisor; and
allocating the plurality of physical CPUs to the plurality of virtual machines without being duplicated.

7. The access method according to claim 1, wherein:
the physical device includes a plurality of physical devices; and
the at least one virtual machine includes a plurality of virtual machines, the access method further comprising:
implementing a same numerical number of non-resident virtual CPUs in each of the plurality of virtual machines as a numerical number of occupancy type physical devices in the plurality of physical devices included in the hardware on the respective virtual machine.

* * * * *